United States Patent
Shore

(10) Patent No.: US 7,680,104 B2
(45) Date of Patent: Mar. 16, 2010

(54) ADDRESS TAGGING FOR NETWORK ADDRESS TRANSLATION (NAT) TRAVERSAL

(75) Inventor: Melinda L. Shore, Ithaca, NY (US)

(73) Assignee: Cisco Technology, Inc., San Jose, CA (US)

(*) Notice: Subject to any disclaimer, the term of this patent is extended or adjusted under 35 U.S.C. 154(b) by 1248 days.

(21) Appl. No.: 10/985,563

(22) Filed: Nov. 9, 2004

(65) Prior Publication Data

US 2006/0098663 A1 May 11, 2006

(51) Int. Cl.
*H04L 12/56* (2006.01)
(52) U.S. Cl. .................. 370/389; 370/392; 370/401
(58) Field of Classification Search ............... 370/389, 370/392; 709/217, 227
See application file for complete search history.

(56) References Cited

U.S. PATENT DOCUMENTS

| | | | | |
|---|---|---|---|---|
| 6,055,236 | A * | 4/2000 | Nessett et al. | 370/389 |
| 6,182,146 | B1 * | 1/2001 | Graham-Cumming, Jr. | 709/238 |
| 7,159,242 | B2 * | 1/2007 | Genty et al. | 726/14 |
| 7,269,744 | B1 * | 9/2007 | Shippy et al. | 713/193 |
| 7,277,453 | B2 * | 10/2007 | Chin et al. | 370/466 |
| 2002/0009088 | A1 * | 1/2002 | Donaghey et al. | 370/397 |
| 2003/0007489 | A1 * | 1/2003 | Krishnan et al. | 370/392 |
| 2003/0016649 | A1 * | 1/2003 | Connors | 370/347 |
| 2003/0231625 | A1 * | 12/2003 | Calvignac et al. | 370/389 |
| 2004/0052259 | A1 * | 3/2004 | Garcia et al. | 370/392 |
| 2004/0071149 | A1 * | 4/2004 | Kim et al. | 370/401 |
| 2006/0013211 | A1 * | 1/2006 | Deerman et al. | 370/389 |

OTHER PUBLICATIONS

"Internet Protocol" (RFC 791), Sep. 1981, (http://www.ietf.org/rfc/rfc791.txt).*
Leon-Garcia, Alberto & Widjaja, Indra, "Chapter 2: Applications and Layered Architectures" from the book Communication Networks, Jul. 1993, The McGraw-Hil Companies, 2nd Edition, pp. 56-61.*
J. Rosenberg, et al. "STUN-Simple Traversal of User Datagram Protocol (UDP) Through Network Address Translators (NATs)," Copyright The Internet Society (2003). RFC 3489. pp. 1-37.
S. Srisuresh, et al. "IP Network Address Translator (NAT) Terminology and Considerations," Copyright The Internet Society (1999). RFC 2663. pp. 1-24.

(Continued)

*Primary Examiner*—Chirag G Shah
*Assistant Examiner*—Salvador E Rivas
(74) *Attorney, Agent, or Firm*—Weaver Austin Villeneuve & Sampson LLP.

(57) ABSTRACT

Disclosed are methods and apparatus for generating, as well as processing data that is traversing (or will be traversing) a translation device, such as a Network Address Translation (NAT) device. In one embodiment, a method of sending data from a first node to a second node is disclosed. The method includes sending a data packet having a header and a payload whereby the header includes (i) one or more fields which identify an application type that uses addresses and indicates that there is a tag present in the payload that serves as a substitute for an address and (ii) an address and whereby the payload includes a tag that is positioned so that it serves as a substitution for an address that is used the identified application. The one or more fields are associated with the address of the header.

70 Claims, 4 Drawing Sheets

OTHER PUBLICATIONS

R.P. Swale, et al. "Middlebox Communications (midcom) Protocol Requirements," Copyright The Internet Society (2002). RFC 3304.

P. Srisuresh, et al., "Middlebox Communication Architecture and Framework," Copyright The Internet Society (2002). RFC 3303. pp. 1-27.

A. Simu, et al., "Method and Apparatus for Indicating Network Address Translation (NAT) Topology Information to a NAT Device that is Physically Separate From an Application Layer Gateway (ALG) Device." U.S. Appl. No. 10/125,300, filed Apr. 17, 2002.

M. Somasundaram, et al., "Method and Apparatus for Handling Embedded Addresses in Data Sent Through Multiple Network Addresses Translation (NAT) Devices." U.S. Appl. No. 10/202,973, filed Jul. 24, 2002.

K. Biswas, et al., "Method and Apparatus for Making End-Host Network Address Translation (NAT) Global Address and Port Ranges Aware", U.S. Appl. No. 10/160,321, filed May 31, 2002.

K. Biswas, et al., "Mechanisms for Detection of Non-Supporting NAT Traversal Boxes in the Path," U.S. Appl. No. 11/026,891, filed Dec. 30, 2004.

* cited by examiner

ADDRESS TAGGING FOR NETWORK ADDRESS TRANSLATION (NAT) TRAVERSAL

BACKGROUND OF THE INVENTION

The present invention relates to methods and apparatus for processing data within a computer network. More specifically, it relates to mechanisms for handling data generated by applications that use embedded addresses while such data is traversing a Network Address Translation (NAT) device or a like device.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may duplicate IP address that are used outside of the local network. When a local computer attempts to communicate with a computer outside the local network, the intermediary device matches the local computer's local IP address (and port) to one of the intermediary device's assigned IP addresses (and ports). The intermediary device then replaces the local computer's local address (and port) with the matched assigned IP address (and port). This matched assigned IP address (and port) is then used to communicate between the local computer and the outside computer. Thus, NAT techniques allow IP address to be duplicated across local networks.

Another solution to the lack of available IP addresses is to redesign the address format to allow for more possible IP addresses. The recent introduction of IPv6 provides 128 bits for the IP address, as compared with IPv4 which provides 32 bits for the IP address. However, until all network devices and computers are converted to IPv6, it is still necessary to allow an existing IPv4 device to communicate with an IPv6 device. One popular method that allows IPv4 to IPv6 communication is referred to as protocol translation (NAT-PT). The IP addresses are converted by NAT-PT from one protocol to another protocol (e.g., IPv4 to IPv6 or vice versa) or, more generally, from an external protocol to an internal protocol. In addition to the IP addresses, the NAT-PT also converts any relevant IPv4 or IPv6 information during a protocol translation.

In addition to IP addresses, a packet may also contain address(es), as well as other protocol specific fields, embedded in the payload that require translation. Particular applications may embed address(es) in the payload for various application specific purposes. A current approach for supporting applications which embed IP addresses in the payload in a NAT environment is to add application-specific knowledge (referred to as an application level gateway or ALG) within the NAT device itself. This approach is described in detail in the Internet Engineering Task Force's Request for Comments document, having RFC 2663, entitled "IP Network Address Translator (NAT) Terminology and Considerations" by P. Srisuresh and M. Holdrege of Lucent Technologies (August 1999), which document is incorporated herein by reference in its entirety.

A NAT device may be configured with various ALG's which correspond to different applications which embed addresses using different formats in the payload. That is, an ALG must be designed for each specific format of the payload so as to be able to locate one or more addresses embedded in the payload by a specific type of application, such as a DNS (domain name server) application.

Other approaches to NAT traversal avoid the problem by allowing a NATted endpoint to "discover" its external address as described in Internet Engineering Task Force's Request for Comments document, having RFC 3489, entitled "Simple Traversal of User Datagram Protocol (UDP) Through Network Address Translators (NATs)" by J. Rosenberg et al. of Cisco Systems, Inc. (March 2003), which document is incorporated herein by reference in its entirety. Another approach allows the endpoint to request an external address or to request it in advance, which is described in (1) the Internet Engineering Task Force's Request for Comments document, having RFC 3304, entitled "Middlebox Communications (midcom) Protocol Requirements" by R. P. Swale et al. of Cisco Systems, Inc. (August 2002) and (2) the Internet Engineering Task Force's Request for Comments document, having RFC 3303, entitled "Middlebox Communications Architecture and Framework" by P. Srisuresh et al. (August 2002), which documents are incorporated herein by reference in their entirety.

Although conventional approaches for NAT traversal with packets containing embedded addresses work adequately under some circumstances, under other situations these approaches have significant disadvantages. Aside from the complexity and expense of these approaches (e.g., supporting stateful inspection for a diversity of protocols and protocol versions in the ALG configured NAT devices), the embedded addresses cannot be handled at all when they are encrypted. Additionally, an endpoint may be configured to perform an integrity check on the data and this check may fail if the data has changed (e.g., an embedded address has been replaced with a different translated address by an ALG-NAT device.

In view of the above, there is a need for improved mechanisms for handling data generated by applications that use embedded addresses, wherein the data traverses a NAT device.

SUMMARY OF THE INVENTION

Accordingly, the present invention provides methods and apparatus for generating, as well as processing data that is traversing (or will be traversing) a translation device, such as a Network Address Translation (NAT) device. In one embodiment, a method of sending data from a first node to a second node is disclosed. The method includes sending a data packet having a header and a payload whereby the header includes (i) one or more fields which identify an application type that uses addresses and indicates that there is a tag present in the payload that serves as a substitute for an address and (ii) an address and whereby the payload includes a tag that is positioned so that it serves as a substitution for an address that is used the identified application. The one or more fields are associated with the address of the header.

In one embodiment, the address of the header is a source address and is a private address of the first node. Alternatively, the address of the header is a destination address and is a public address of the second node. In one implementation, the one or more fields of the header is a single tag equal to the tag in the payload. In another aspect, the one or more fields of the header comprise an application type that identifies an application that uses an address and a tag that equals the tag in the payload and wherein the payload further includes the application type adjacent to the tag in the payload.

The tag, application type, and address of the header may be associated with each other in any manner. In one aspect, the tag, application type and address of the header are contiguous fields in the header. In another aspect, the tag in the header is positioned between the application type and the address of the header. In yet another aspect, the application type in the header is positioned between the tag and the address in the header. Alternatively, the tag in the header is adjacent to the address in the header.

In another embodiment, the invention pertains to a computer system operable to send data from a first node to a second node. The computer system includes one or more processors and one or more memory. At least one of the memory and processors are adapted to provide at least some of the above described method operations. In yet a further embodiment, the invention pertains to a computer program product for sending data from a first node to a second node. The computer program product has at least one computer readable medium and computer program instructions stored within at least one of the computer readable product configured to perform at least some of the above described method operations.

In another embodiment, a method of translating data sent from a first node to a second node is disclosed. A data packet is received and the data packet has a header and a payload whereby the header includes (i) one or more fields which identify an application type that uses addresses and indicates that there is a tag present in the payload that serves as a substitute for an address and (ii) an address, wherein the one or more fields are associated with the address of the header, and whereby the payload includes a tag that is positioned so that it serves as a substitution for an address that is used the identified application. An address or port is translated only in the header and the payload is not searched for any embedded addresses nor are any addresses translated in the payload. The translated data packet is forwarded towards its destination.

In a specific aspect, the address of the header is a source address and is a private address of the first node that is translated into a public address corresponding to the first node. In another aspect, the address of the header is a destination address and is a public address of the second node that is translated into a private address corresponding to the second node.

In another embodiment, the invention pertains to a computer system operable to translate data sent from a first node to a second node. The computer system includes one or more processors and one or more memory. At least one of the memory and processors are adapted to provide at least some of the above described method operations. In yet a further embodiment, the invention pertains to a computer program product for translating data sent from a first node to a second node. The computer program product has at least one computer readable medium and computer program instructions stored within at least one of the computer readable product configured to perform at least some of the above described method operations.

In yet another embodiment, a method of processing data sent from a first node to a second node is disclosed. A data packet having a header and a payload is received. It is determined whether the header includes (i) one or more fields which identify an application type that uses addresses and indicates that there is a tag present in the payload that serves as a substitute for an address and (ii) an address that is associated with the one or more fields. When it is determined that the header includes (i) one or more fields which identify an application type that uses addresses and indicates that there is a tag present in the payload that serves as a substitute for an address and (ii) an address that is associated with the one or more fields, the tag in the payload is replaced with the address from the header. The payload is then processed after the tag has been replaced.

In a specific aspect, the processing of the payload includes obtaining the address and using it to communicate with the first node. In another aspect, the processing of the payload includes obtaining the address and using it to create a firewall pin hole.

In another embodiment, the invention pertains to a computer system operable to process data sent from a first node to a second node. The computer system includes one or more processors and one or more memory. At least one of the memory and processors are adapted to provide at least some of the above described method operations. In yet a further embodiment, the invention pertains to a computer program product for processing data sent from a first node to a second node. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
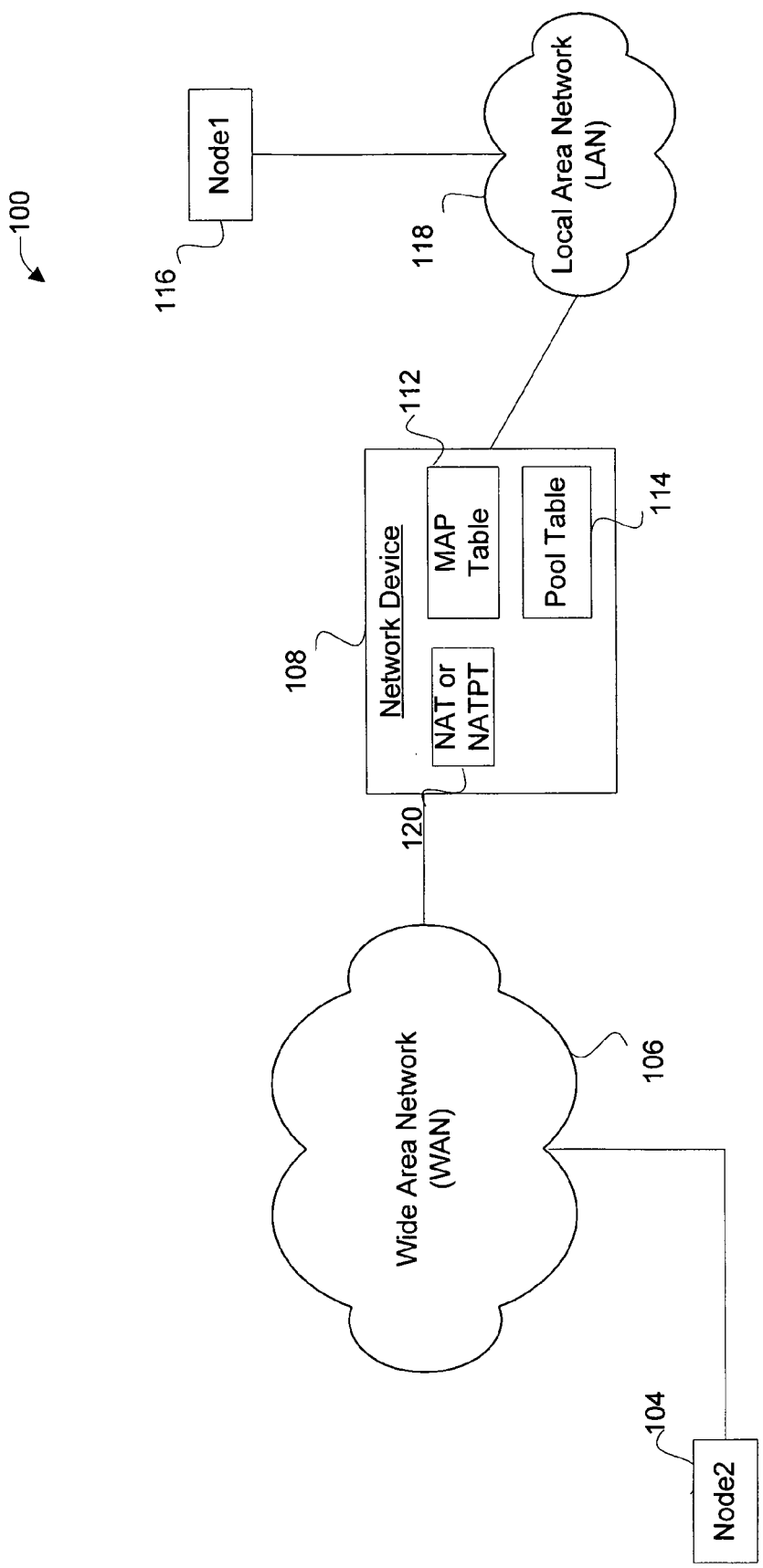
FIG. 1 is a diagrammatic representation of a network in which techniques of the present invention may be implemented in accordance with one embodiment of the present invention.

FIG. 1 is a diagrammatic representation of a network 100 in which techniques of the present invention may be implemented in accordance with one embodiment of the present invention. As shown, the network 100 includes a plurality of devices interconnected via a wide area network (WAN) 106, such as the Internet. Each device may also be coupled to the WAN 106 through a local area network (LAN) or one or more network devices. In the illustrated example, a first node device 116 (Node1) is coupled via LAN 118 and network device 108 to WAN 106. WAN 106 and/or LAN 118 may include any number and type of network elements, routers, NAT, PAT, or NAT-PT devices, nodes, clients, servers, and devices.

In this embodiment, the network device is configured to implement any suitable translation process 120, such as NAT, PAT or NAT-PT. In general, the network device 108 may use NAT to translate between an internal and external address, PAT to translate between an internal and external port, or NAT-PT to translate between different protocols, such as IPv4 and IPv6 protocols. Any combination of these translation protocols may be implemented by network device 108. Although the term NAT device is used herein to describe the techniques of the present invention, it is recognized that these novel techniques may be practiced in the context of other types of translation devices, such as a PAT device or a NAT-PT device or any combination thereof.

The network device 108 (referred herein to as the "NAT device") may utilize any suitable number and type of data structures for facilitating its operations as described herein. For example, the NAT device 108 may utilize an address pool table 114 having available translation addresses for the LAN 118 and a map table 112 for tracking bindings between private and public addresses (e.g., internal and external addresses or IPv4 and IPv6 addresses).

Figure 2:
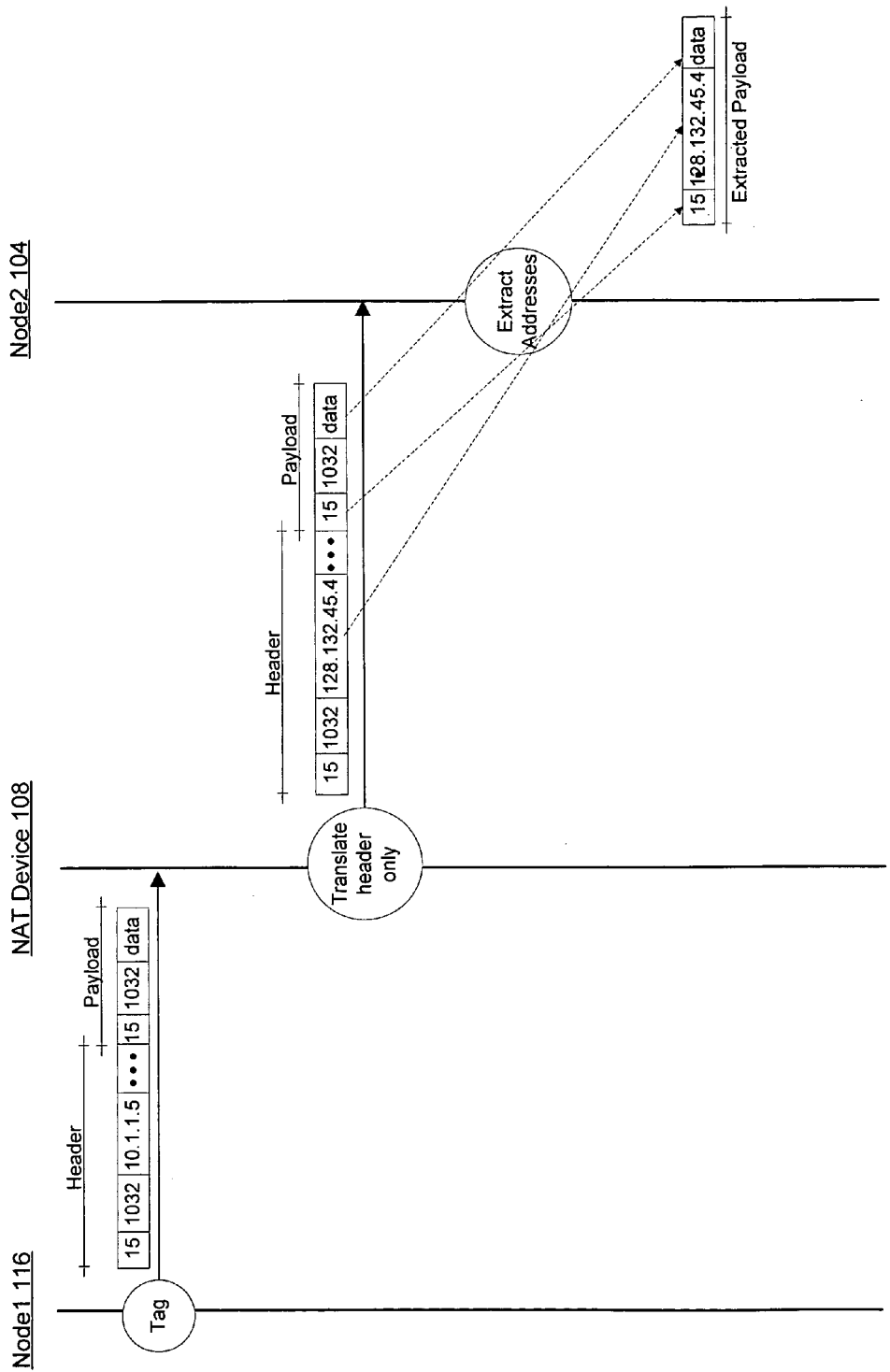
FIG. 2 is a communication diagram illustrating a first node sending data to a second node through a NAT (network address translation) device in accordance with one embodiment of the present invention.
Figure 3:
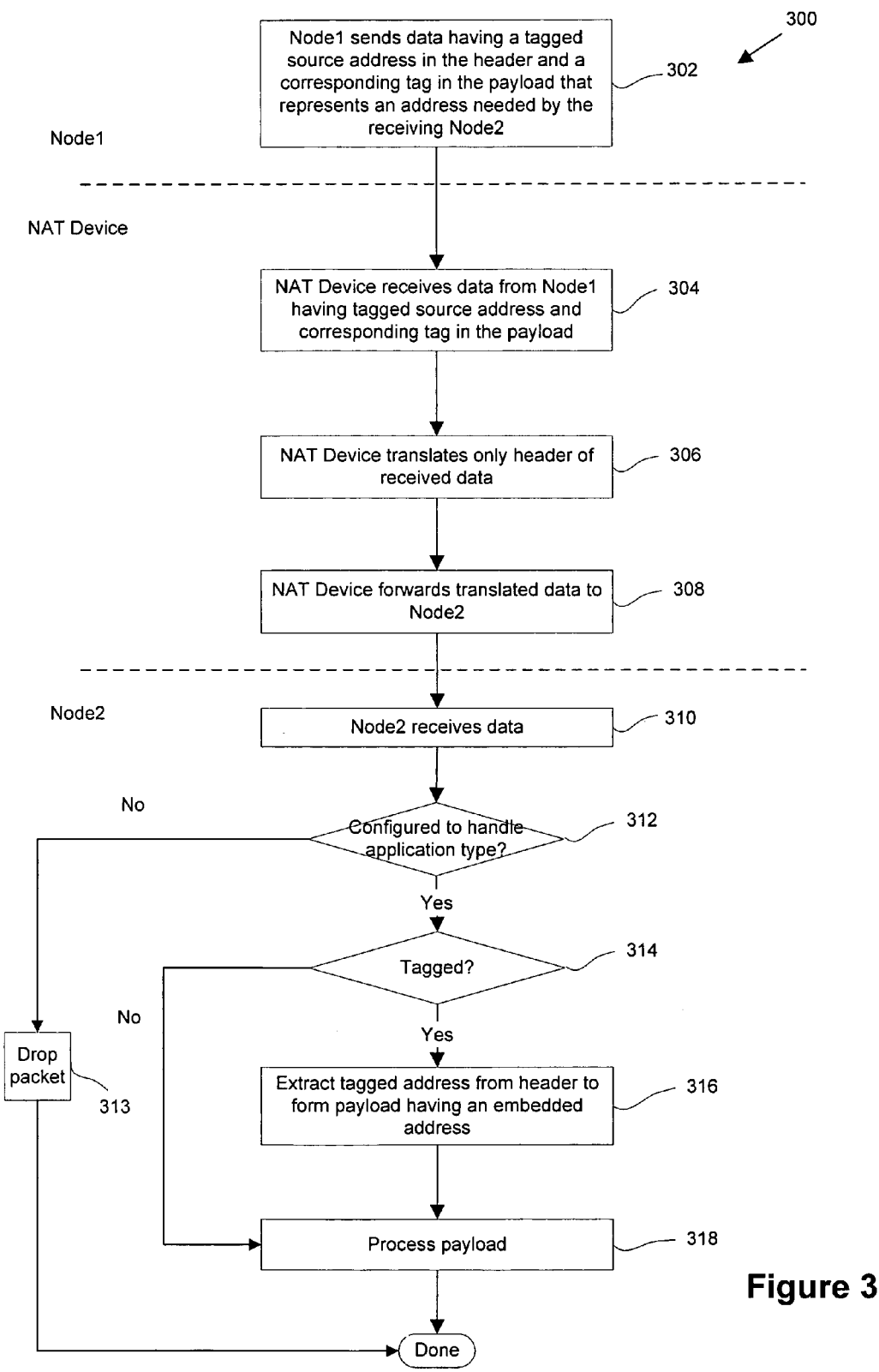
FIG. 3 is a flowchart illustrating a procedure for generating and handling data when the application which generates the data needs to provide an address in the payload in accordance with a specific implementation of the present invention.
Figure 4:
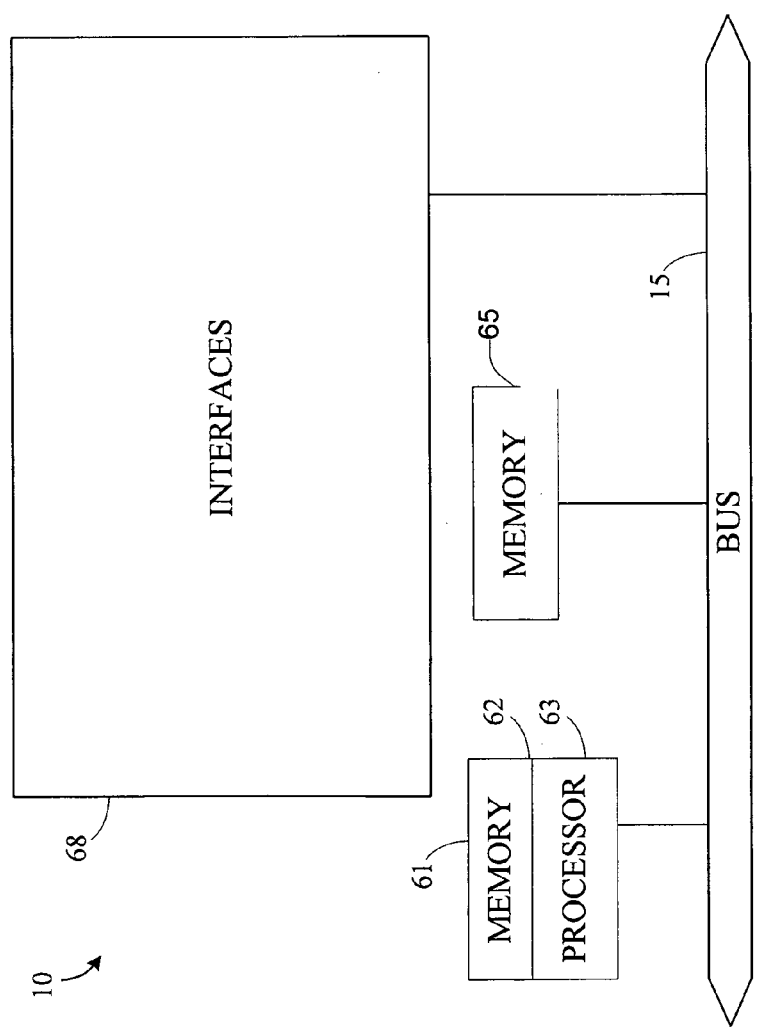
FIG. 4 is a diagrammatic representation of a router in which embodiments of the present invention may be implemented.

In general terms, the present invention provides mechanism for handling data which is generated for applications which need to provide an address in the payload. FIG. 2 is a communication diagram in which Node1 116 sends data to Node2 104 through NAT device 108 (of FIG. 1) in accordance with one embodiment of the present invention. FIG. 3 is a flowchart illustrating a procedure for generating and handling such data when the application which generates the data needs to provide an address in the payload in accordance with a specific implementation of the present invention. FIG. 3 is described herein in conjunction with FIG. 2.

Although the examples presented herein describe and illustrate an endpoint Node1 sending data to another endpoint Node2, of course, any suitable device may send or receive the data. For example, a firewall positioned on either side of the NAT device 108 may instead receive data from Node1 104. Also, the data by Node1 may be sent to NAT device 108 and intercepted along the way by another device, such as a firewall, positioned on a path between the NAT device 108 and Node1.

Initially, Node1 sends data having a tagged source address in the header and a corresponding tag in the payload that represents an address needed by the receiving Node2 in operation 302. The header and payload also preferably includes an application type identifying an application which utilizes one or more addresses. As shown in FIG. 2, Node1 sends a packet with an application type equal to 15, a tag equal to 1032, and a source address equal to 10.1.1.5 in the header.

Of course, the header also contains other fields which are not shown. The packet sent by Node1 also includes the same application type 15 and tag 1032 in the payload, as well as other "data" specific to the application. For example, the application type 15 could correspond to a Network Layer Signaling (NLS) protocol for a telephony application and the tag 1032 in the payload corresponds to the address 10.1.1.5, which is specified in the header. In this application, Node1 is specifying an address 10.1.1.5 that can be used by the called party (e.g., Node2) for communicating with Node1 (the calling party).

The source address in the header may be tagged in any suitable manner. As shown in FIG. 2, the tag 1032 is adjacent to the source address, as well as the application type 15. However, these fields may be rearranged in any suitable order so that they are associated with one another. In one example, the tag, application type and source address of the header are contiguous fields in the header. In another example, the tag may precede the application type or may follow the source address although the destination address typically follows the source address. Alternatively, the application type in the header is positioned between the tag and the source address. In either example, the tag and the application type in the payload are positioned so that they are also associated with one another, e.g., they are adjacent to each other. In an alternative embodiment, a single tag may indicate both the application type and server as a substitute for an address in the payload. In one implementation, an application type itself may serve as the tag in the payload.

After Node1 sends the tagged data, a NAT device (e.g., Network Device 108 of FIG. 1) receives the data having the tagged source address and corresponding tag in the payload in operation 304. The NAT device the translates only the header of the received data in operation 306. That is, the NAT device does not analyze the payload for embedded addresses since the data will always only contain tags instead of embedded addresses. As shown in FIG. 2, the private source address 10.1.1.5 of the header is replaced by public address 128.132.45.4. In one implementation, the NAT device obtains the public address from its pool table (e.g., 114 of FIG. 1). The NAT device also tracks the newly formed binding for private address 10.1.1.5 and public address 128.132.45.4. This may be accomplished in any suitable manner such as creating an entry corresponding to the binding in a MAP table (e.g., 112 of FIG. 1). After translation of the header, the NAT device then forwards the translated data to the destination node (e.g., Node2) in operation 308.

The translated data is then received Node2, the destination node, in operation 310. Of course, any intermediary node (e.g., a firewall) in the path of the data may also process the data as described below with respect to operations 312 through 318. It is then determined whether the data is tagged in operation 312. Node2 determines whether it is configured to handle the particular application type specified in the header in operation 312. For example, the receiving node checks whether it has the application engine specified by the application type. In the present example, application type 15 specifies the NLS protocol and Node2 determines whether it can process NLS type messages. If the receiving node (Node2) determines that it cannot handle the data, it may simply drop the data packet in operation 313. Alternatively, an error message may be sent back to the sending node.

If it is instead determined that Node2 is capable of handling the particular application type, Node2 then determines whether the data implements tags that correspond to addresses used by the application in operation 314. If the data is tagged, the address is extracted from the header and used to form a payload having an embedded address in operation 316. In other words, the address required by the particular application type may be obtained by extracting the address from the header and replacing the tag in the payload with the extracted address. In the illustrated example of FIG. 2, the application type field and data of the payload are retained while the tag 1032 of the payload is replaced by the tagged address 128.132.45.4 of the header.

After the payload is formed, the payload is then processed in operation 318. For instance, the payload and any required addresses are sent to the specified application engine. That is, the payload with an embedded address now replacing the previous tag of the payload is then sent to the application engine for normal processing.

The above described example illustrates an application which uses a single address in the payload and this address is the source address of the sending node. Of course, an application may utilize a destination address instead of a source address and, accordingly, the techniques of the present invention may also be applied to the destination address. That is, the application type and tag may be associated with the destination address in the header, rather than the source address. Additionally, more than one address may be utilized by the application. That is, there may be multiple tags in the payload to indicate multiple addresses. In this later case, all of the tags in the payload are replaced by the corresponding tagged address in the header by the receiving node and only the header is translated by any intermediary NAT devices. These multiple tags may correspond to different or the same application types.

Embodiments of the present invention provide several advantages. For example, the need for a stateful inspection at the NAT device is avoided. Accordingly, a broad range of protocols may be supported by each NAT device since each NAT device does not have to be configured for each new protocol since it only needs to translate the header and not inspect the payload for differently formatted embedded addresses. Additionally, encrypted protocol streams with addresses may be easily used since the traversed NAT devices do not have to examine the payload content. Integrity-protected protocol streams with address data may also be used while correctly traversing cooperating NAT devices.

One application in which techniques of the present invention are advantageous involves a first node sending a request to create a firewall pinhole for a particular address to one or more firewalls. Conventionally, this address would be embedded in the payload. Thus, the firewall when it receives the packet may have a translated or untranslated embedded address, depending on where the firewall sits relative to the NAT device. In the present invention, the firewall would instead receive a tag in the payload whether the packet has traversed through a NAT device or not since only the header is translated by the NAT device. The firewall could then obtain the payload and replace the tag in the payload with the tagged address in the header without the NAT device having to know anything about the formatting of the payload.

Generally, the techniques for sending or handling data having address data (as well as for translating addresses and protocols) of the present invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, one or more techniques of the present invention may be implemented on a general-purpose network host machine such as a personal computer or workstation. Further, the invention may be at least partially implemented on a card (e.g., an interface card) for a network device or a general-purpose computing device.

Referring now to FIG. 6, a router 10 suitable for implementing portions of the present invention (such as the data generation techniques, the translation operations, or the data processing techniques) includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing any combination of the above described techniques of the present invention. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, a MAP table, a pool table, connection tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of sending data from a first node to a second node, comprising:
    prior to sending a data packet having a header and a payload for an application that requires an IP address to be embedded in the payload, generating, by the first node the data packet to include (i), in the header, a tag that is adjacent to the IP address that is required by the application whereby the header and
    (ii), in the payload, the same tag as a replacement for the IP address that is required by the application such that the IP address is not embedded in the payload; and
    sending, by the first node, the data packet with the header including the tag and the adjacent IP address and the payload including the same tag as a replacement to the IP address that is required by the application such that the IP address is not embedded in the payload, wherein the tag comprises an application type field that identifies the application that uses the IP address and a tag field and wherein the application type field is adjacent to the tag field in the payload.

2. A method as recited in claim 1, wherein the tag in the header and the payload is a numeric value.

3. A method as recited in claim 1, wherein the IP address of the header is a source IP address and is a private IP address of the first node.

4. A method as recited in claim 1, wherein the IP address of the header is a destination IP address and is a public IP address of the second node.

5. A method as recited in claim 1, wherein the tag field, application type field, and IP address of the header are contiguous fields in the header.

6. A method as recited in claim 1, wherein the tag field in the header is positioned between the application type field and the IP address of the header.

7. A method as recited in claim 1, wherein the application type field in the header is positioned between the tag field and the IP address in the header.

8. A method as recited in claim 1, wherein the tag field in the header is adjacent to the IP address in the header.

9. A method as recited in claim 1, wherein the data packet is a Network Layer Signaling packet.

10. A computer system operable to send data from a first node to a second node, the computer system comprising:
    one or more processors;
    one or more memory, wherein at least one of the processors and memory are adapted for:
    prior to sending a data packet having a header and a payload for an application that requires an IP address to be embedded in the payload, generating the data packet to include (i), in the header, a tag that is adjacent to the IP address that is required by the application whereby the header and
    (ii), in the payload, the same tag as a replacement for the IP address that is required by the application such that the IP address is not embedded in the payload; and
    sending the data packet with the header including the tag and the adjacent IP address and the payload including the same tag as a replacement to the IP address that is required by the application such that the IP address is not embedded in the payload, wherein the tag comprises an application type field that identifies the application that uses the IP address and a tag field and wherein the application type field is adjacent to the tag field in the payload.

11. A computer system as recited in claim 10, wherein the tag in the header and the payload is a numeric value.

12. A computer system as recited in claim 10, wherein the IP address of the header is a source IP address and is a private IP address of the first node.

13. A computer system as recited in claim 10, wherein the IP address of the header is a destination IP address and is a public IP address of the second node.

14. A computer system as recited in claim 10, wherein the tag field, application type field, and IP address of the header are contiguous fields in the header.

15. A computer system as recited in claim 10, wherein the tag field in the header is positioned between the application type field and the IP address of the header.

16. A computer system as recited in claim 10, wherein the application type, field in the header is positioned between the tag field and the IP address in the header.

17. A computer system as recited in claim 10, wherein the tag field in the header is adjacent to the IP address in the header.

18. A computer system as recited in claim 10, wherein the data packet is a Network Layer Signaling packet.

19. A computer program product for sending data from a first node to a second node, the computer program product comprising:
    at least one computer readable medium;
    computer program instructions stored within the at least one computer readable product configured for:

prior to sending a data packet having a header and a payload for an application that requires an IP address to be embedded in the payload, generating the data packet to include (i), in the header, a tag that is adjacent to the IP address that is required by the application whereby the header and (ii), in the payload, the same tag as a replacement for the IP address that is required by the application such that the IP address is not embedded in the payload; and sending the data packet with the header including the tag and the adjacent IP address and the payload including the same tag as a replacement to the IP address that is required by the application such that the IP address is not embedded in the payload, wherein the tag comprises an application type field that identifies the application that uses the IP address and a tag field and wherein the application type field is adjacent to the tag field in the payload.

20. A computer program product as recited in claim 19, wherein the tag in the header and the payload is a numeric value.

21. A computer program product as recited in claim 19, wherein the IP address of the header is a source IP address and is a private IP address of the first node.

22. A computer program product as recited in claim 19, wherein the address of the header is a destination address and is a public address of the second node.

23. A computer program product as recited in claim 19, wherein the tag field, application type field, and IP address of the header are contiguous fields in the header.

24. A computer program product as recited in claim 19, wherein the tag field in the header is positioned between the application type field and the IP address of the header.

25. A computer program product as recited in claim 19, wherein the application type field in the header is positioned between the tag. field and the IP address in the header.

26. A computer program product as recited in claim 19, wherein the tag field in the header is adjacent to the IP address in the header.

27. A computer program product as recited in claim 19, wherein the data packet is a Network Layer Signaling packet.

28. An apparatus for sending data from a first node to a second node, comprising:

means for prior to sending a data packet having a header and a payload for an application that requires an IP address to be embedded in the payload, generating, by the first node, the data packet to include (i), in the header, a tag that is adjacent to the IP address that is required by the application whereby the header and (ii), in the payload, the same tag as a replacement for the IP address that is required by the application such that the IP address is not embedded in the payload; and means for sending, by the first node, the data packet with the header including the tag and the adjacent IP address and the payload including the same tag as a replacement to the IP address that is required by the application such that the IP address is not embedded in the payload, wherein the tag comprises an application type field that identifies the application that uses the IP address and a tag field and wherein the application type field is adjacent to the tag field in the payload.

29. A method of translating data sent from a first node to a second node, comprising:

receiving, by a translation device, a data packet having a header and a payload for an application that requires an IP address to be embedded in the payload, whereby the data packet includes (i), in the header, a tag, wherein the tag comprises of an application type field and a tag field, that is adjacent to the IP address that is required by the application and (ii), in the payload, the same tag comprises of an application type field and a tag field, as a replacement for the IP address that is required by the application such that the IP address is not embedded in the payload;

translating, by a translation device, the IP address only in the header and not searching the payload for the IP addresses or translating such IP address in the payload, even though the application for which such data packet was generated requires the IP address to be embedded in the payload; and forwarding, by a translation device, the translated data packet towards its destination.

30. A method as recited in claim 29, wherein the tag in the header and the payload is a numeric value.

31. A method as recited in claim 29, wherein the IP address of the header is a source IP address and is a private address of the first node that is translated into a public IP address corresponding to the first node.

32. A method as recited in claim 29, wherein the IP address of the header is a destination IP address and is a public IP address of the second node that is translated into a private IP address corresponding to the second node.

33. A method as recited in claim 29, wherein the tag field, application type field, and IP address of the header are contiguous fields in the header.

34. A computer system operable to translate data sent from a first node to a second node, the computer system comprising:

one or more processors;

one or more memory, wherein at least one of the processors and memory are adapted for:

receiving a data packet having a header and a payload for an application that requires an IP address to be embedded in the payload, whereby the data packet includes (i), in the header, a tag, wherein the tag comprises of an application type field and a tag field, that is adjacent to the IP address that is required by the application and (ii), in the payload, the same tag comprises of an application type field and a tag field, as a replacement for the IP address that is required by the application such that the IP address is not embedded in the payload;

translating the IP address only in the header and not searching the payload for the IP addresses or translating such IP address in the payload, even though the application for which such data packet was generated requires the IP address to be embedded in the payload; and forwarding the translated data packet towards its destination.

35. A computer system as recited in claim 34, wherein the tag in the header and the payload is a numeric value.

36. A computer system as recited in claim 34, wherein the IP address of the header is a source IP address and is a private IP address of the first node that is translated into a public IP address corresponding to the first node.

37. A computer system as recited in claim 34, wherein the IP address of the header is a destination IP address and is a public IP address of the second node that is translated into a private IP address corresponding to the second node.

38. A computer system as recited in claim 34, wherein the tag field, application type field, and IP address of the header are contiguous fields in the header.

39. A computer program product for translating data sent from a first node to a second node, the computer program product comprising:

at least one computer readable medium;
computer program instructions stored within the at least one computer readable product configured for:
receiving a data packet having a header and a payload for an application that requires an IP address to be embedded in the payload, whereby the data packet includes (i), in the header, a tag, wherein the tag comprises of an application type field and a tag field, that is adjacent to the IP address that is required by the application and (ii), in the payload, the same tag comprises of an application type field and a tag field, as a replacement for the IP address that is required by the application such that the IP address is not embedded in the payload;
translating the IP address only in the header and not searching the payload for the IP addresses or translating such IP address in the payload, even though the application for which such data packet was generated requires the IP address to be embedded in the payload; and
forwarding the translated data packet towards its destination.

40. A computer program product as recited in claim 39, wherein the tag in the header and the payload is a numeric value.

41. A computer program product as recited in claim 39, wherein the IP address of the header is a source IP address and is a private IP address of the first node that is translated into a public IP address corresponding to the first node.

42. A computer program product as recited in claim 39, wherein the IP address of the header is a destination IP address and is a public IP address of the second node that is translated into a IP private address corresponding to the second node.

43. A computer program product as recited in claim 39, wherein the tag field, application type field, and IP address of the header are contiguous fields in the header.

44. An apparatus for translating data sent from a first node to a second node, comprising:
means for receiving a data packet having a header and a payload for an application that requires an IP address to be embedded in the payload, whereby the data packet includes (i), in the header, a tag, wherein the tag comprises of an application type field and a tag field, that is adjacent to the IP address that is required by the application and (ii), in the payload, the same tag comprises of an application type field and a tag field, as a replacement for the IP address that is required by the application such that the IP address is not embedded in the payload;
means for translating the IP address only in the header and not searching the payload for the IP addresses or translating such IP address in the payload, even though the application for which such data packet was generated requires the IP address to be embedded in the payload; and
means for forwarding the translated data packet towards its destination.

45. A method of processing data sent from a first node to a second node, comprising:
receiving, by a second node, a data packet having a header and a payload for an application that requires an IP address to be embedded in the payload;
when it is determined that the header includes a tag that is adjacent to the IP address that is required by the application and that the payload includes the same tag as a replacement for the IP address that is required by the application such that the IP address is not embedded in the payload, replacing at least a portion of the tag in the payload with the IP address from the header that is associated with the tag, wherein the tag comprises an application type field that identifies the application that uses the IP address and a tag field and wherein the application type field is adjacent to the tag field in the payload; and
processing, by a second node, the IP address of the payload after at least a portion of the tag has been replaced with such IP address.

46. A method as recited in claim 45, wherein the tag in the header and the payload is a numeric value.

47. A method as recited in claim 45, wherein the IP address of the header is a source IP address and is a private IP address of the first node.

48. A method as recited in claim 45, wherein the IP address of the header is a destination IP address and is a public IP address of the second node.

49. A method as recited in claim 45, wherein the tag field, application type field, and IP address of the header are contiguous fields in the header.

50. A method as recited in claim 49, further comprising determining whether the identified application is available for processing the received data packet, and wherein the IP address is only extracted when it is determined that the identified application is available for processing the received data packet.

51. A method as recited in claim 49, wherein processing of the payload includes obtaining the IP address and using it to communicate with the first node.

52. A method as recited in claim 49, wherein processing of the payload includes obtaining the IP address and using it to create a firewall pin hole.

53. A computer system operable to process data sent from a first node to a second node, the computer system comprising:
one or more processors;
one or more memory, wherein at least one of the processors and memory are adapted for:
receiving a data packet having a header and a payload for an application that requires an IP address to be embedded in the payload;
when it is determined that the header includes a tag that is adjacent to the IP address that is required by the application and that the payload includes the same tag as a replacement for the IP address that is required by the application such that the IP address is not embedded in the payload, replacing at least a portion of the tag in the payload with the IP address from the header that is associated with the tag, wherein the tag comprises an application type field that identifies the application that uses the IP address and a tag field and wherein the application type field is adjacent to the tag field in the payload; and
processing the IP address of the payload after at least a portion of the tag has been replaced with such IP address.

54. A computer system as recited in claim 53, wherein the tag in the header and the payload is a numeric value.

55. A computer system as recited in claim 53, wherein the IP address of the header is a source IP address and is a private IP address of the first node.

56. A computer system as recited in claim 53, wherein the IP address of the header is a destination IP address and is a public IP address of the second node.

57. A computer system as recited in claim 53, wherein the tag field, application type field, and IP address of the header are contiguous fields in the header.

58. A computer system as recited in claim 57, wherein the at least one of the processors and memory are further adapted for determining whether the identified application is available for processing the received data packet, and wherein the IP address is only extracted when it is determined that the identified application is available for processing the received data packet.

59. A computer system as recited in claim 57, wherein processing of the payload includes obtaining the IP address and using it to communicate with the first node.

60. A computer system as recited in claim 57, wherein processing of the payload includes obtaining the IP address and using it to create a firewall pin hole.

61. A computer program product for processing data sent from a first node to a second node, the computer program product comprising:
    at least one computer readable medium;
    computer program instructions stored within the at least one computer readable product configured for:
    receiving a data packet having a header and a payload for an application that requires an IP address to be embedded in the payload;
    when it is determined that the header includes a tag that is adjacent to the IP address that is required by the application and that the payload includes the same tag as a replacement for the IP address that is required by the application such that the IP address is not embedded in the payload, replacing at least a portion of the tag in the payload with the IP address from the header that is associated with the tag, wherein the tag comprises an application type field that identifies the application that uses the IP address and a tag field and wherein the application type field is adjacent to the tag field in the payload; and
    processing the IP address of the payload after at least a portion of the tag has been replaced with such IP address.

62. A computer program product as recited in claim 61, wherein the tag in the header and the payload is a numeric value.

63. A computer program product as recited in claim 61, wherein the IP address of the header is a source IP address and is a private IP address of the first node.

64. A computer program product as recited in claim 61, wherein the IP address of the header is a destination IP address and is a public IP address of the second node.

65. A computer program product as recited in claim 61, wherein the tag field, application type field, and IP address of the header are contiguous fields in the header.

66. A computer program product as recited in claim 65, wherein the computer program instructions stored within the at least one computer readable product are further configured for determining whether the identified application is available for processing the received data packet, and wherein the IP address is only extracted when it is determined that the identified application is available for processing the received data packet.

67. A computer program product as recited in claim 65, wherein processing of the payload includes obtaining the address and using it to communicate with the first node.

68. A computer program product as recited in claim 65, wherein processing of the payload includes obtaining the IP address and using it to create a firewall pin hole.

69. An apparatus for processing data sent from a first node to a second node, comprising:
    means for receiving a data packet having a header and a payload for an application that requires an IP address to be embedded in the payload;
    means for replacing at least a portion of the tag in the payload with the IP address from the header that is associated with the tag, wherein the tag comprises an application type field that identifies the application that uses the IP address and a tag field and wherein the application type field is adjacent to the tag field in the payload, when it is determined that the header includes a tag that is adjacent to the IP address that is required by the application and that the payload includes the same tag as a replacement for the IP address that is required by the application such that the IP address is not embedded in the payload; and
    processing the IP address of the payload after at least a portion of the tag has been replaced with such IP address.

70. A computer system operable to forward data from a first node to a second node, the computer system comprising:
    a first node configured for:
    prior to sending a data packet having a header and a payload for an application that requires an IP address to be embedded in the payload, generating the data packet to include (i), in the header, a tag that is adjacent to the IP address that is required by the application whereby the header and
    (ii), in the payload, the same tag as a replacement for the IP address that is required by the application such that the IP address is not embedded in the payload; and
    sending the data packet with the header including the tag and the adjacent IP address and the payload including the same tag as a replacement to the IP address that is required by the application such that the IP address is not embedded in the payload, wherein the tag comprises an application type field that identifies the application that uses the IP address and a tag field and wherein the application type field is adjacent to the tag field in the payload:
    a translation device configured for:
    receiving the data packet sent by the first node;
    translating an IP address or port only in the header and not searching the payload for any embedded IP addresses or translating any IP addresses in the payload; and
    forwarding the translated data packet towards its destination.

* * * * *